W. S. PROUDFIT, W. H. EDWARDS & A. F. WINTERS.
LOOSE LEAF BINDER.
APPLICATION FILED MAR. 26, 1917.
1,292,046.
Patented Jan. 21, 1919.
2 SHEETS—SHEET 1.
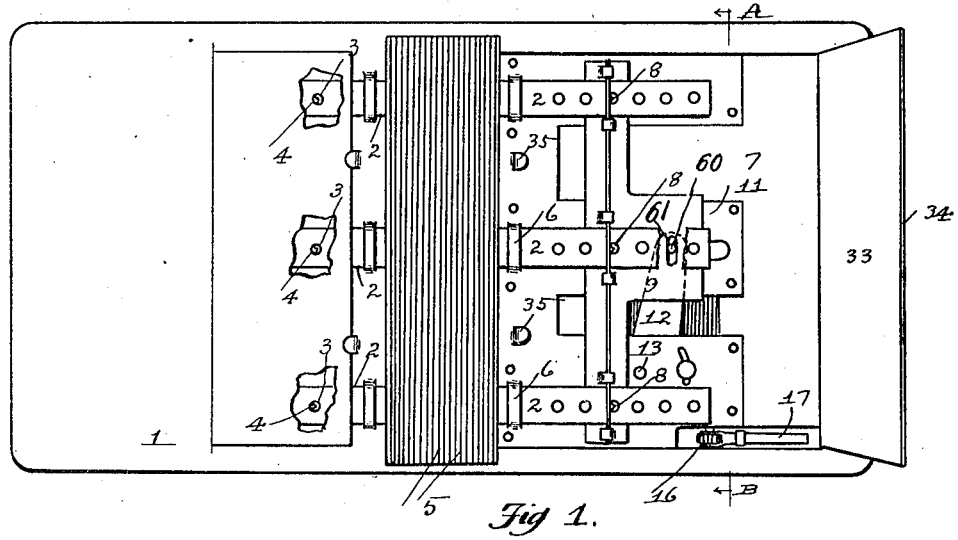
Fig. 1.
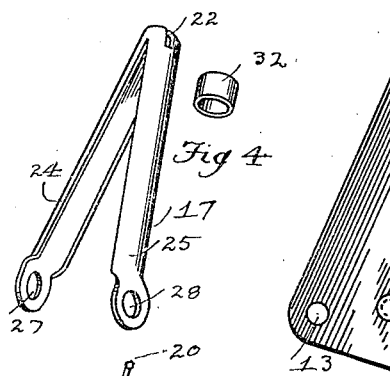
Fig. 4.
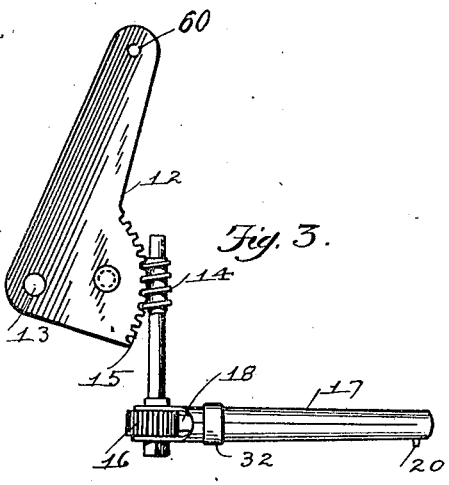
Fig. 3.
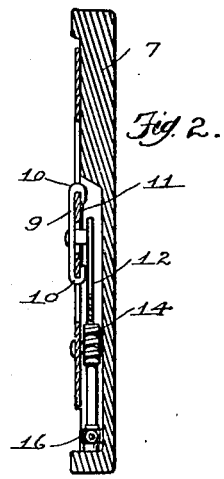
Fig. 2.
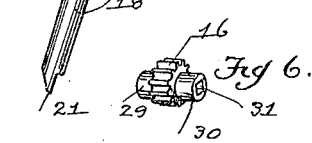
Fig. 5.
Fig. 6.
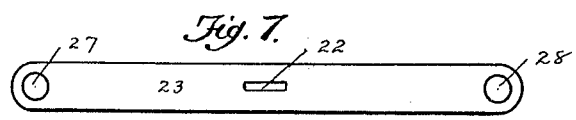
Fig. 7.
Witnesses
D. W. Bradford
Inventors
William S. Proudfit
William H. Edwards
Alexander F. Winters
By
Cyrus W. Rice
their Attorney W. S. PROUDFIT, W. H. EDWARDS & A. F. WINTERS.
LOOSE LEAF BINDER.
APPLICATION FILED MAR. 26, 1917.
1,292,046.
Patented Jan. 21, 1919.
2 SHEETS—SHEET 2.
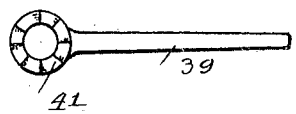
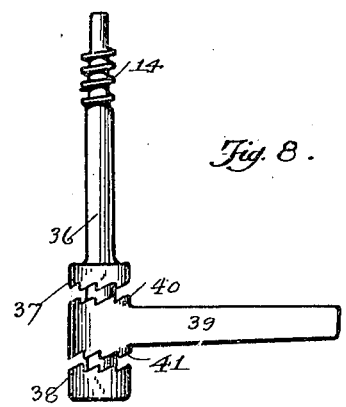
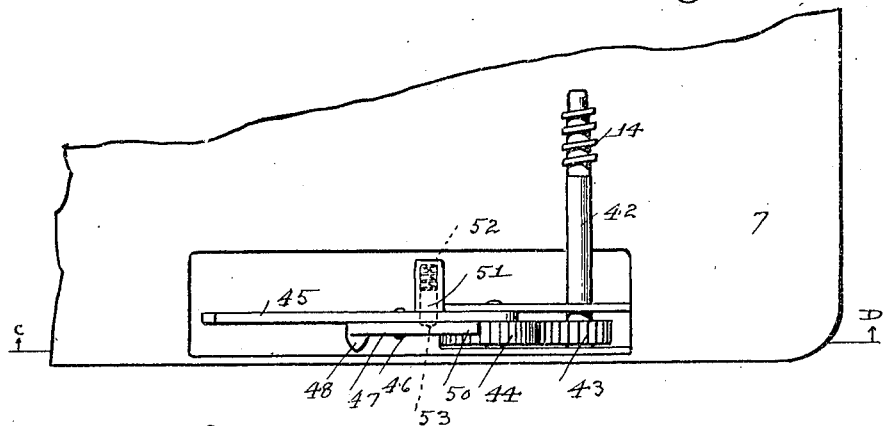
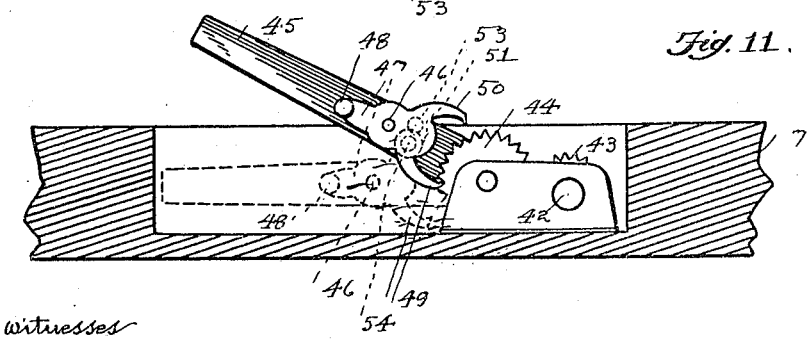
Witnesses
D. W. Bradford
Inventors
William S. Proudfit
William H. Edwards
Alexander F. Winters
By Cyrus W. Rice
their Attorney

UNITED STATES PATENT OFFICE.

WILLIAM S. PROUDFIT, WILLIAM H. EDWARDS, AND ALEXANDER F. WINTERS, OF GRAND RAPIDS, MICHIGAN, ASSIGNORS TO THE PROUDFIT LOOSE LEAF COMPANY, OF GRAND RAPIDS, MICHIGAN, A CORPORATION OF MICHIGAN.

LOOSE-LEAF BINDER.

1,292,046.　　　　Specification of Letters Patent.　　Patented Jan. 21, 1919.

Application filed March 26, 1917.　Serial No. 157,343.

*To all whom it may concern:*

Be it known that we, WILLIAM S. PROUDFIT, WILLIAM H. EDWARDS, and ALEXANDER F. WINTERS, citizens of the United States, residing at Grand Rapids, in the county of Kent and State of Michigan, have invented new and useful Improvements in Loose-Leaf Binders, of which the following is a specification.

The present invention relates to loose-leaf binders; and its object is to provide for such devices an improved adjusting mechanism comprising a lever adapted to rotate by a ratchet a rotatable member which tightens or loosens the leaf-holding bands or members.

This and any other objects appearing hereinafter are attained by, and the invention finds preferable embodiment in, the structure hereinafter described and illustrated by the accompanying drawings, in which:—

Figure 1 is a plan view of an opened loose-leaf binder;

Fig. 2 is a sctional view of the same taken on a plane corresponding to line A—B of Fig. 1;

Fig. 3 is a view of parts of the adjusting mechanism;

Figs. 4, 5 and 6 show certain parts of such mechanism;

Fig. 7 shows the operating lever partially formed;

Figs. 8 and 9 illustrate a modified construction; and

Figs. 10 and 11 show another modified construction.

In the preferable embodiment of the invention chosen for illustration by the drawings and for detailed description in the body of this specification, the loose-leaf binder has a pair of swinging covers, to one of which, 1, the flexible and preferably resilient leaf-holding members, as spring steel bands 2, are secured, as by lugs 3 on said cover engaging in holes 4 of such bands. These bands pass through suitable slots (not shown) in the binding edge of the removable leaves 5 in the well-known manner, and extend under clips 6 on the inside of the cover 7 to points of attachment, as the lugs 8 on the cross bar 9, which cross bar is movable as by its turned over edges 10 sliding on the guide 11, toward and away from the binding edge of said cover. This cross bar is thus moved to loosen or tighten the leaf-holding members, by a bell-crank lever 12 fulcrumed at 13 and swung by rotatable means,—the worm 14—which meshes with the toothed segment 15 of the bell-crank lever.

The lever 12 has a pin 60 engaging in the slot 61 in the cross bar 9.

No claim is made herein to the parts or mechanism so far described.

In order to rotate this rotatable member 14, a toothed wheel 16 is carried thereby, and a hand-operated lever 17 is fulcrumed on the shaft of the worm. Inside this lever, which is hollow, a ratchet pawl 18 is pressed longitudinally by a spring 19 into engagement with the wheel's teeth. This pawl may be turned on its longitudinal axis by its transversely turned handle portion 20, so that when turned to one position its beveled extremity 21 will engage the wheel's teeth to turn the worm one way, slipping freely over such teeth when the lever is swung reversely: and when the pawl is turned half way around, its said extremity engages the teeth to rotate the worm in the opposite direction, and slip over the teeth when the lever is swung reversely. When the pawl is drawn outwardly against the pressure of said spring, it does not engage the teeth at all.

A slot 22 is formed transversely of the free end of the lever, into which the pawl's handle portion 20 may drop and be held by the spring, such handle portion thus acting as a detent, to hold the pawl in either of its operative positions. It is evident that by turning the pawl to one of its positions and operating the lever, the leaf-holding members are tightened; and by turning the pawl to its other position and operating the lever, such members are loosened.

The lever, and connected parts are simply and economically constructed and assembled as shown: The lever is formed by pressing a metal sheet or strip 23 into concavo-convex form and cutting the slot 22 in its middle portion and the orifices 27, 28 near its ends as shown in Fig. 7, and then turning the concave sides of the bent halves 24, 25 toward each other (Fig. 4). The pawl is now inserted into the hollow lever, its handle or detent portion 20 passing through the slot 22, and the outer end of the spring 19 abutting against a cap piece 26 through which the pawl freely slides and which is seated inside the lever at its free end. The halves 24, 25 of the lever are now closed so that their orifices 27, 28 surround the hubs 29, 30 of the toothed wheel, whose squared central orifice 31 fits on the shaft of the worm 14. The halves of the lever are securely joined by suitable means, as by slipping over the lever the sleeve 32 and pressing it down toward the fulcrum. (Fig. 3.)

A swinging flap 33 may be provided to inclose the mechanism, its free edge 34 being releasably held under hooks or clips 35.

A modified construction is illustrated in Figs. 8 and 9. In Fig. 8 the shaft 36 of the worm carries inwardly facing ratchet wheels 37, 38 spaced apart, the teeth on one raking oppositely to the teeth on the other, as shown. The lever 39 turning freely on the shaft carries on each side the pawl teeth 40, 41 and may be slid along the shaft sufficiently to engage the pawl teeth 40 with the ratchet wheel 37 or the teeth 41 with the wheel 38, or to such an intermediate position (shown in Fig. 8) that no pawl teeth engage.

Fig. 9 is a side view of this lever. It will be seen that by thus sliding the lever to one position or the other and rotating the same, the leaf-holding members will be tightened or loosened.

Another modified construction is illustrated in Figs. 10 and 11, the first being an inside plan view of the cover carrying the adjusting mechanism and the second being a section of the same on line C—D of Fig. 10. In this construction the shaft 42 of the worm carries a gear 43 meshing with a gear 44 on whose spindle is fulcrumed the lever 45. On this lever is pivotally mounted at 46 a pawl member 47 adapted to be turned by its handle portion 48 to one position in which the pawl 49 engages as shown the teeth of the gear 44 when the lever is swung in one direction but slips freely over such teeth when the lever is swung oppositely; but when the pawl member is turned to its opposite position the other pawl 50 operates similarly but rotates the shaft in the opposite direction. The pawl member is releasably held in desired position by the slidable detent 51 spring pressed at 52 into one or the other keeper orifice 53 or 54. The gear 44 having more teeth than the gear 43, the turning movement of the worm shaft is faster than that of the lever.

What is claimed is:

1. In a device of the character described; a pair of covers; a leaf-holding flexible member secured to one cover; rotatable means carried by the other cover and adapted to move said member longitudinally; a lever; ratchet mechanism intermediate the lever and the rotatable means for turning said means by the lever.

2. In a device of the character described; a pair of covers; a leaf-holding flexible member secured to one cover; rotatable means carried by the other cover and adapted to move said member longitudinally; a lever; reversible rachet mechanism intermediate the lever and the rotatable means for turning said means either way by the lever.

3. In a device of the character described; a pair of covers; a leaf-holding flexible member secured to one cover; rotatable means carried by the other cover and adapted to move said member longitudinally; a lever; a toothed wheel carried by said rotatable means; a pawl carried by the lever and having a turning movement around its longitudinal axis, and adapted when turned to one position to engage the wheel's teeth and rotate the rotatable means in one direction and adapted when turned to another position to engage said teeth and rotate said means in the opposite direction.

4. In a device of the character described; a pair of covers; a leaf-holding flexible member secured to one cover; rotatable means carried by the other cover and adapted to move said member longitudinally; a lever having a retaining socket; a toothed wheel carried by said rotatable means; a pawl carried by the lever and spring-pressed longitudinally into engagement with the wheel's teeth, and having a turning movement around its longitudinal axis, and adapted when turned to one position to rotate the rotatable means in one direction and when turned to another position to rotate said means in the opposite direction, and having a detent adapted to be releasably held in the socket by the spring to retain the pawl in one of its said positions.

5. In a device of the character described; a pair of covers; a leaf-holding flexible member secured to one cover; rotatable means carried by the other cover and adapted to move said member longitudinally; a lever; a pair of meshing gears one having more teeth than the other and one being carried by said rotatable means; ratchet means intermediate the lever and the other gear for turning said gear by the lever.

In testimony whereof we have hereunto set our hands.

WILLIAM S. PROUDFIT.
WILLIAM H. EDWARDS.
ALEXANDER F. WINTERS.